June 3, 1941.    J. L. E. LIPPÉ    2,244,465
VALVE CAP HOLDER
Filed May 7, 1940
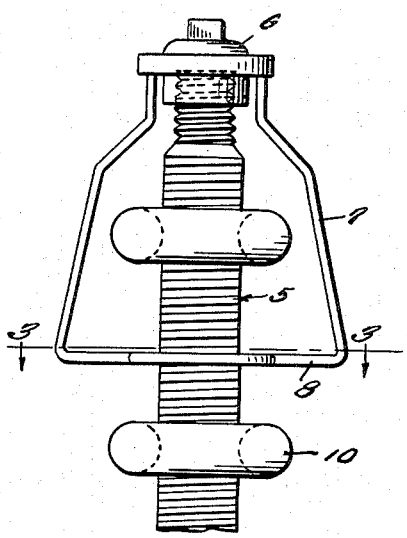
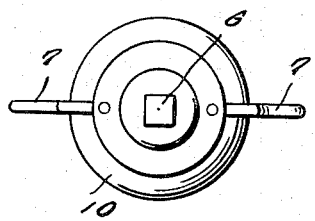
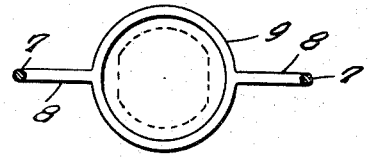
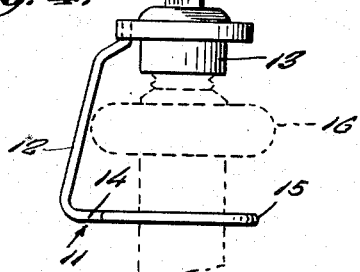
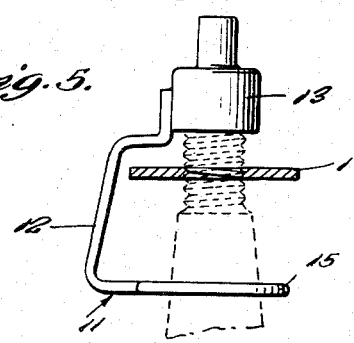
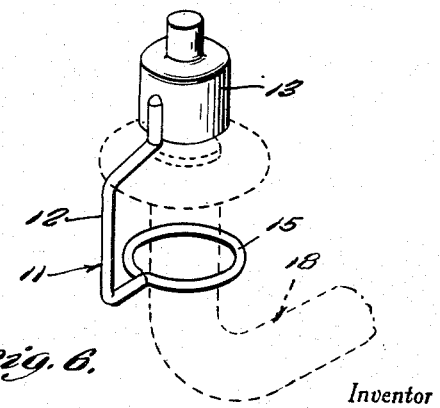
Inventor
Joseph L. E. Lippe
By Clarence A. O'Brien
Attorney Patented June 3, 1941

2,244,465

UNITED STATES PATENT OFFICE 2,244,465

VALVE CAP HOLDER

Joseph L. E. Lippé, Pawtucket, R. I.

Application May 7, 1940, Serial No. 333,827

1 Claim. (Cl. 138—89.3)

This invention relates to a valve cap holder, and has for the primary object the provision of an efficient and inexpensive device of this character which will permit the customary application and removal of a cap from a valve stem and will prevent loss or the cap falling onto the ground when detached from the stem, consequently obviating the possibility of the cap depositing dirt collected from the ground into the valve construction when the cap is again applied to the valve stem.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which Figure 1 is a fragmentary side elevation illustrating an inflating valve for a pneumatic tire equipped with a holder for securing thereto the usual cap and constructed in accordance with my invention.

Figure 2 is a top plan view illustrating the same.

Figure 3 is a sectional view taken on the line 3—3 of Figure 1.

Figure 4 is a fragmentary side elevation partly in section illustrating a modification of the present invention.

Figure 5 is a side elevation, partly in section, illustrating another modification of the invention.

Figure 6 is a perspective view illustrating another modification of the invention.

Referring in detail to the drawing, the numeral 5 indicates as an entirety a conventional type of inflating valve for a pneumatic tire and 6 the cap employed for preventing the entrance of dirt and other foreign matter to the valve construction during the use of the tire. The cap 6 is threaded onto the valve construction or stem thereof in the usual way. In order to inflate the tire, it is necessary to remove the cap and it is the customary practice to lay the cap on the ground or some part of the automobile and frequently the cap falls or rolls and becomes lost or becomes covered with dirt and when reapplied will apply dirt to the valve construction which in many instances renders the valve defective or liable to the loss of air from the tire.

With the present invention installed on the valve construction and attached to the cap, the latter may be conveniently removed from the valve stem and supported thereby so that the usual tire inflating operation can be carried out and the cap replaced on the valve stem without danger of loss or coming in contact with dirt and other foreign matter.

The present invention consists of a pair of converging arms 7 joined onto opposite sides of the cap and formed integrally with a connecting member 8, a portion of which is of annular formation, as shown at 9, to encircle the valve stem. The annular portion 9 of the present invention has a loose fit with the valve stem so that the cap can be readily threaded onto and off of the valve stem as usual. The valve cap when removed may gravitate and will be supported by the present invention laterally of the valve stem so that an air inflating hose fitting can be applied to the end of the stem as usual for the inflation of the tire.

Mounted on the valve stem above and below the annular member 9 are spaced annular members 10 acting as stops for limiting the upward and downward movement of the present invention on the valve stem. The annular members 10 are preferably constructed of rubber or any other material suitable for the purpose and have a frictional fit with the valve stem.

Referring to my modified form of the invention, the holder is indicated in entirety by the character 11 and consists of an arm 12 secured onto the cap 13 and also formed integrally with an extension 14 forming a part of an annular member 15. The annular member 15 is mounted on the valve stem with a loose fit so that the cap can be threaded onto and removed from the valve stem. It is to be understood that the holder rotates with the cap in the threading of the cap onto and off of the stem. An annular stop member 16 is mounted on the stem for preventing the annular member 15 of the holder from moving off of the stem. The annular stop member 16 is constructed similar to the annular members 10.

Referring to my modified form of the invention, as shown in Figure 5, the holder 11 is shown as applied to a valve stem in which the latter is provided with a covering of rubber or any other material suitable for the purpose. Applied to the threaded portion of the stem in a stop washer 17 for preventing the holder 11 from moving accidentally off of the valve stem. The washer 17 is threaded onto the stem.

Referring to Figure 6, it will be seen that the holder 11 is applied to a valve stem 18 of substantially L-shape.

While I have shown and described the holder as secured or fixed onto the valve cap it is to be understood that through a minor change the holder may be rotatably connected to the valve cap if so desired.

While I have shown and described the preferred embodiment of my invention, it will be understood that minor changes in construction, combination and arrangement of parts may be made without departing from the spirit and scope of the invention as claimed.

Having thus described my invention, what I claim is:

In a valve cap holder, a cap adapted for threading on and off of a valve stem, an arm integral with said cap and extending laterally therefrom and terminating in an end portion extending in the direction of the valve stem, an annular rigid member integral with said end portion of the arm and loosely fitting the valve stem whereby the cap may be rotated relative to the valve stem and be positioned a limited distance laterally of the valve stem when detached therefrom, and spaced annular cushion members frictionally gripping the valve stem and substantially equally spaced from opposite sides of the rigid annular member when said cap is fully applied to said valve stem whereby the rigid annular member during the application and removal of the cap may move endwise of the valve stem to permit the cap to freely clear the end of the valve stem, said annular cushion members acting to prevent full disengagement of the rigid annular member from the valve stem and one of said annular cushion members acting as a support for the rigid annular member and thereby sustain the cap positioned laterally of the valve stem and spaced a distance from the end of said valve stem to permit free application of an inflating fitting thereto.

JOSEPH L. E. LIPPÉ.